(12) United States Patent
Fischer

(10) Patent No.: US 7,746,590 B2
(45) Date of Patent: Jun. 29, 2010

(54) CURRENT MIRRORS HAVING FAST TURN-ON TIME

(75) Inventor: Jonathan H. Fischer, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 1433 days.

(21) Appl. No.: 11/140,269

(22) Filed: May 27, 2005

(65) Prior Publication Data

US 2006/0072231 A1 Apr. 6, 2006

Related U.S. Application Data

(60) Provisional application No. 60/616,718, filed on Oct. 6, 2004.

(51) Int. Cl.
*G11B 5/02* (2006.01)

(52) U.S. Cl. .................. 360/67; 360/46; 360/61; 360/66; 360/68; 330/255; 330/256; 330/257

(58) Field of Classification Search .............. None
See application file for complete search history.

(56) References Cited

U.S. PATENT DOCUMENTS

| | | | | |
|---|---|---|---|---|
| 4,121,120 A * | 10/1978 | Wetterling | ............ | 327/96 |
| 4,437,023 A * | 3/1984 | Gill, Jr. | ............ | 327/108 |
| 5,045,806 A * | 9/1991 | Yan | ............ | 330/252 |
| 5,349,305 A * | 9/1994 | Hsiao et al. | ............ | 330/253 |
| 5,386,328 A * | 1/1995 | Chiou et al. | ............ | 360/68 |
| 5,790,336 A * | 8/1998 | Voorman et al. | ............ | 360/68 |
| 5,805,015 A | 9/1998 | Bruccoleri et al. | | |
| 5,822,141 A * | 10/1998 | Chung et al. | ............ | 360/46 |
| 5,880,599 A * | 3/1999 | Bruno | ............ | 326/56 |
| 6,222,695 B1 * | 4/2001 | Canario | ............ | 360/68 |
| 6,316,998 B1 * | 11/2001 | Oikawa | ............ | 330/255 |
| 6,337,778 B1 * | 1/2002 | Gagne | ............ | 360/51 |
| 6,392,485 B1 * | 5/2002 | Doi et al. | ............ | 330/253 |
| 6,400,190 B1 * | 6/2002 | Lacombe | ............ | 327/110 |
| 6,496,317 B2 * | 12/2002 | Lacombe | ............ | 360/68 |
| 6,512,697 B1 * | 1/2003 | Li et al. | ............ | 365/185.21 |
| 6,538,495 B2 * | 3/2003 | Goutti et al. | ............ | 327/538 |
| 6,842,075 B2 * | 1/2005 | Johnson et al. | ............ | 330/296 |
| 6,850,104 B2 * | 2/2005 | Fattaruso | ............ | 327/202 |
| 6,956,428 B1 * | 10/2005 | Voo | ............ | 327/538 |
| 6,965,266 B1 * | 11/2005 | Can | ............ | 330/252 |
| 6,975,473 B2 * | 12/2005 | Ngo | ............ | 360/66 |
| 7,102,439 B2 * | 9/2006 | Heightley et al. | ............ | 330/261 |
| 7,110,198 B1 * | 9/2006 | Aram et al. | ............ | 360/46 |
| 7,113,005 B2 * | 9/2006 | Ono et al. | ............ | 327/53 |
| 7,187,222 B2 * | 3/2007 | Meltzer et al. | ............ | 327/202 |
| 7,425,867 B2 * | 9/2008 | Aemireddy et al. | ......... | 330/257 |

(Continued)

FOREIGN PATENT DOCUMENTS

EP 0 775 969 A3 9/1997

(Continued)

*Primary Examiner*—Dismery E Mercedes
(74) *Attorney, Agent, or Firm*—Mendelsohn, Drucker & Associates, P.C.; Steve Mendelsohn

(57) ABSTRACT

A current mirror circuit providing a fast turn on time. A node within the circuit is held at a first voltage when the current mirror is off to permit the node voltage to quickly reach a necessary value when the current mirror circuit is turned on.

23 Claims, 6 Drawing Sheets

U.S. PATENT DOCUMENTS

| | | | |
|---|---|---|---|
| 7,443,226 B1 * | 10/2008 | Holloway et al. | 327/513 |
| 7,466,200 B2 * | 12/2008 | Fischer | 330/257 |
| 2004/0190176 A1 | 9/2004 | Takeuchi | |
| 2005/0105204 A1 * | 5/2005 | Bloodworth et al. | 360/75 |

FOREIGN PATENT DOCUMENTS

| | | |
|---|---|---|
| JP | 2096411 A | 4/1990 |
| JP | 2001 1332964 A | 11/2001 |

* cited by examiner

CURRENT MIRRORS HAVING FAST TURN-ON TIME

This application claims the benefit of U.S. Provisional Patent Application No. 60/616,718 filed on Oct. 6, 2004.

FIELD OF THE INVENTION

The present invention relates generally to a hard disk drive data storage system, and more particularly to a method for turning on current mirrors within the hard disk drive data storage system and an apparatus comprising current mirrors for the hard disk drive storage system.

BACKGROUND OF THE INVENTION

Disk drives are a cost effective data storage system for use with a computer or other data processing devices. As shown in FIG. 1, a disk drive 10 comprises a magnetic recording medium, in the form of a disk or platter 12 having a hub 13 and a magnetic read/write transducer 14, commonly referred to as a read/write head. The read/write head 14 is attached to, or formed integrally with, a suspension arm 15 suspended over the disk 12 and affixed to a rotary actuator arm 16. A structural arm 18, fixed to a platform 20 of the disk drive 10, is pivotably connected to the actuator arm 16 at a pivot joint 22. A voice coil motor 24 drives the actuator arm 16 to position the head 14 over a selected position on the disk 12.

As the disk 12 is rotated by a spindle motor (not shown) at an operating speed, the moving air generated by the rotating disk, in conjunction with the physical features of the suspension arm 15, lifts the read/write head 14 away from the platter 12, allowing the head to glide or fly on a cushion of air slightly above a surface of the disk 12. The flying height of the read/write head over the disk surface is typically less than a micron.

An arm electronics module 30 may include circuits that switch the head function between read and write operations and write drivers for supplying write current to the head 14 during write operations. The write current alters magnetic domains within the disk 12 to store data thereon. The arm electronics module 30 may also include a preamplifier electrically connected to the head 14 by flexible conductive leads 32. During read operations the preamplifier amplifies the read signals produced by the head 14 to increase the read signal signal-to-noise ratio. In the write mode, the preamplifier scales up the relatively low voltage levels representing the data bits to be written to the disk to a voltage range of about +/−6 to +/−10V. The preamplifier also shapes the write signal to optimize the data writing process.

The configuration and components of the electronics module 30 may vary according to the disk drive design, as will be understood by persons familiar with such technology. Although the module 30 may be mounted anywhere in the disk drive 10, a location proximate the head 14 minimizes signal losses and induced noise in the head signals during a read operation. A preferred mounting location for the module 30 comprises a side surface of the structural arm 18 as shown in FIG. 1.

As shown in FIG. 2, the disk 12 comprises a substrate 50 and a thin film 52 disposed thereover. During write operations current through a write head 14A alters magnetic domains of ferromagnetic material in the thin film 52 for storing the data bits as magnetic transitions. During read operations a read head 14B senses the magnetic transitions to determine the data bits stored on the disk 12.

In other data storage systems the head 14 operates with different types of storage media (not shown in the Figures) comprising, for example, a rigid magnetic disk, a flexible magnetic disk, magnetic tape and a magneto-optical disk.

The disk drive read head 14B comprises either a magneto-resistive (MR) sensor or an inductive sensor. The former produces a higher magnitude output signal in response to the magnetic transitions, and thus the output signal exhibits a greater signal-to-noise ratio than an output signal produced by the inductive sensor. The MR sensor is thus preferred, especially when a higher areal data storage density in the disk drive 10 is desired.

A DC (direct current) voltage of about 0.04V to 0.2V is supplied by the preamplifier to the read head terminals 54A and 54B via the conductive leads 32 for biasing the read head 14B. Magnetic domains in the thin film 52 passing under the read head 14B alter a resistance of the magneto-resistive material, imposing an AC (alternating current) component on the DC bias voltage, wherein the AC component represents the read data bits. The AC component is detected in the preamplifier, but has a relatively small magnitude (e.g., several millivolts) with respect to the DC bias voltage.

Operation of the preamplifier read circuits is not required during those times when data is not being read from the disk 12. Since power consumption is not typically an operational limitation for a desktop computer, the read circuits in the desktop computer disk drive system are maintained in an on state when data is not being read from the disk 12. This feature minimizes a turn-on time for the read circuits (specifically the turn-on time for preamplifier current mirrors operative when reading data) and ensures that the preamplifier processes the magnetic transitions from the beginning of the data read interval.

The desktop preamplifier may be switched to a semi-active state (idle mode) if the computer does not access the disk drive 10 for an extended length of time, and may be shut down to a very low power level (sleep mode) when the computer switches to a sleep state. The disk drive system 10 permits a relatively long (i.e., several microseconds to milliseconds) power-up time for the preamplifier to transition from the sleep or idle mode to one of the fully active modes (e.g., the read or the write mode).

In contrast to a desktop computer system, battery power conservation is a crucial design objective for mobile and portable computing devices and data processing systems, for stored music players and for other battery-operated devices that include a mass data storage system operative with a preamplifier. To minimize preamplifier power consumption and thereby conserve battery power, the preamplifier read circuits are turned off when data is not being read from the hard disk drive. For example, the read circuits are turned off during data writing. But to avoid data losses during a read operation and to provide high-speed data access, it is desired that the preamplifier read circuits turn-on and reach a desired steady state condition in less than about 100 ns.

Returning to FIG. 2, the output signal from the read head 14B, representing data bits read from the disk drive 10 and having an amplitude in a range of several millivolts, is input to a signal processing stage 102 followed by an output or buffer stage 104. Typically, both the signal processing stage 102 and the output stage 104 are included within the preamplifier. The output stage 104 scales up the head signal voltage to a peak voltage value in a range of several hundred millivolts and supplies the scaled-up signal to channel circuits of a channel chip 106. The channel chip 106 detects the read data bits from the voltage pulses, while applying error detection and correction processes to the voltage pulses.

FIG. 3 illustrates a conventional prior art output stage 104 of FIG. 2. A PMOSFET M2 is gated on to supply a reference current Iref0 (25 microamps in one embodiment) that is directed to a collector C of a bipolar junction transistor (BJT) Q1 (operating as a current mirror master) and to a gate G of an n-channel metal oxide semiconductor field effect transistor NMOSFET) M0 to turn on the NMOSFET M0. A source S of the PMOSFET M2 and a drain D of the NMOSFET M0 are connected to a positive power supply voltage VP (in one embodiment about 3.3 V) and a source S of M2 is connected to a base B of the transistor Q1. When the NMOSFET M0 is on, the BJT Q1 is gated on and the current Iref0 flows through the BJT Q1 and a resistor R11 to ground. As is known, the base current of a BJT can change over a five to one range due to the BJT fabrication process variations and due to temperature variations during operation. A resistor R7 operates as a pull down resistor for the NMOSFET M0 to ensure M0 supplies sufficient bias current for proper operation of the current mirror transistors Q1, Q2, Q3, Q4 and Q5 over all expected process, temperature and operating conditions. In those applications where battery power conservation is advisable, the current Iref0 is terminated when data is not being read from the disk 12, i.e., when data is being written to the disk 12 and during idle periods when data is neither being written nor read.

The BJTS Q2, Q3, Q4 and Q5 are also gated on by the on-state of the NMOSFET M0. Assuming that the BJTS Q1, Q2, Q3, Q4 and Q5 are matched, have substantially identical base-emitter voltages and operate with properly-scaled emitter resistors R11, R10, R13, R14 and R15, then the BJTS Q1, Q2, Q3, Q4 and Q5 operate as scaled current mirrors. By properly scaled emitter resistors is meant that each resistor R11, R10, R13, R14 and R15 is scaled based on the BJT with which the resistor is associated, i.e., R10=R11/k1, R13=R11/k2, R14=R11/k3 and R15=R11/k4, where k1-k4 represent an emitter area ratio for each of the BJT's Q2-Q5 relative to the emitter area of Q1, that is, Q2=Q1*k1, Q3=Q11*k2, Q4=Q1*k3 and Q5=Q1*k4). The BJTS Q2, Q3, Q4 and Q5 function as constant current sources for their associated BJTS Q7, Q6, Q12 and Q9. The current Iref0 through the BJT Q1 is mirrored and scaled (according to the associated scaling value k) through the BJTS Q2, Q3, Q4 and Q5.

A collector C of a BJT Q7 is connected to the power supply VP through a resistor R17, and a base B of Q7 is driven by a bias voltage (not shown) and voltage pulses from the signal processing stage 102. When an amplifier comprising BJTS Q6 and BJT Q7 is active, the BJT Q7 is driven to an on state or on condition and the current Iref through the BJT Q1 is mirrored as a current I2 through resistors R10 and R17 and the BJTS Q7 and Q2. Since the BJTS Q1 and Q2 form a current mirror, then I2=k1*Iref, where k1 is the ratio of the emitter area of BJT Q2 to the emitter area of BJT Q1. Typically such area ratioed BJTS are formed from a plurality of unit transistors, that is, the BJT Q2 comprises k1 times the number of unit transistors comprising the BJT Q1.

The negative feedback action of the emitter resistors R10 and R11 increases the impedance seen looking into the collector of the BJT Q1 and the BJT Q2 enough such that the ratio of I2 to Iref is a very weak function of Q2's collector-emitter voltage, as long as Q2's collector-emitter voltage is greater than approximately 0.5V. Thus as can be appreciated by those skilled in the art, the variation of I2 with the collector-emitter voltage of BJT Q2 is neglected herein.

A state of the current mirror BJT Q3 is controlled by the NMOSFET M0. The BJT Q6 is biased by the signal processing stage 102, which supplies both the signal and DC bias to the base B of the BJT Q6. When the BJTS Q3 and Q6 are both gated on, a current I3 flows through resistors R19 and R13 and the BJTS Q3 and Q6, where I3=k2*Iref, since the BJTS Q1 and Q3 are current mirrors and Q3=Q1*k2.

The BJTS Q6 and Q7 form a differential amplifier with a degeneration resistor R20 connected between the emitter of the BJT Q6 and the emitter of the BJT Q7 to linearize the amplification and stabilize the gain. The signal from signal processing stage 102 biases the amplifier inputs (the base of each one of the BJTS Q6 and Q7) and presents the processed data signal that is amplified (i.e., scaled-up) and buffered by the output stage 104 before driving an interconnect to the channel chip 106, i.e., terminals RDP and RDN.

The BJTS Q9 and Q12 buffer collector loads R17 and R19 to drive the interconnect to the channel chip 106 from a low impedance thereby maintaining a wide bandwidth, typically up to about 700 MHz.

In FIG. 3 the NMOSFET M0 supplies the base drive current for each of the current mirror BJTS Q1, Q2, Q3, Q4 and Q5. In one embodiment each BJT base current is about 16 microamps, for a total of about 80 microamps. The current Iref is substantially equivalent to the collector current of the BJT Q1, since substantially no current flows to the gate G of the NMOSFET M0.

A circuit loop comprising the base/collector path of the BJT Q1 and the gate/source path of the NMOSFET M0 forms a feedback loop that, like all feedback loops, tends to oscillate. The oscillations are limited or controlled by a capacitor C0 connected between the collector of the BJT Q1 and ground. The loop bandwidth is controlled by the current through the NMOSFET M0, as determined by the resistor R7 and is increased by the base current supplied to the BJTS Q1, Q2, Q3, Q4, and Q5.

Although the capacitor C0 advantageously prevents feedback loop oscillation, it also disadvantageously extends the turn-on time of the current mirror BJTS Q1, Q2, Q3, Q4 and Q5 as the current mirrors do not turn on until the capacitor C0 has charged. The output signal does not appear at the terminals RDP and RDN until the current mirrors have turned on. Thus the output signal is delayed by the charging time of the capacitor C0. In certain embodiments of the output stage 104 the output signal delay exceeds the objective of about 100 nanoseconds.

SUMMARY OF THE INVENTION

According to one embodiment, the present invention comprises a current mirror controller for controlling current mirrors, comprising: a control node having a reference current therethrough; a current mirror master connected to the control node and receiving the reference current, the current mirror master connected to the current mirrors; a first switching device connected to a power supply controlling a state of the current mirror master; a circuit module configured to control a voltage at the control node to a first voltage during a first operational mode; and the circuit module configured to control the voltage at the control node to a second voltage during a second operational mode, wherein the first switching device controls the current mirror master to an on state during the second operational mode during which the current mirrors mirror the reference current.

According to another embodiment, the invention comprises a method for controlling current mirrors, comprising: controlling a voltage at a control node to a first voltage during a first operational mode and to a second voltage during a second operational mode, wherein a capacitor is connected to the control node; supplying a reference current through the control node to a current mirror master, wherein during the second operational mode the reference current is mirrored and scaled by the current mirrors; and charging the capacitor from the first voltage to the second voltage at an onset of the second operational mode such that after the capacitor is charged to the second voltage the current mirrors are turned on to mirror the reference current.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described device features are not drawn to scale, but are drawn to emphasize specific features relevant to the invention. Reference characters denote like elements throughout the figures and text.

DETAILED DESCRIPTION OF THE INVENTION

Before describing in detail the particular method and apparatus related to an output stage of a preamplifier for a disk drive system, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

Figure 1:
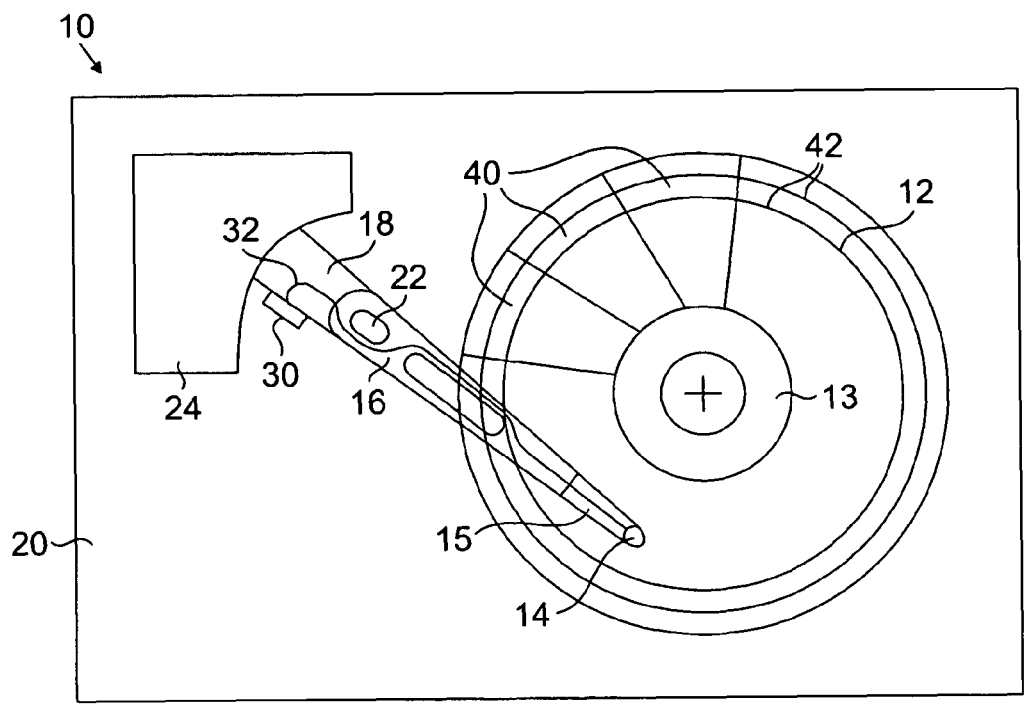
FIG. 1 illustrates a prior art disk drive to which the teachings of the present invention can be applied.
Figure 2:
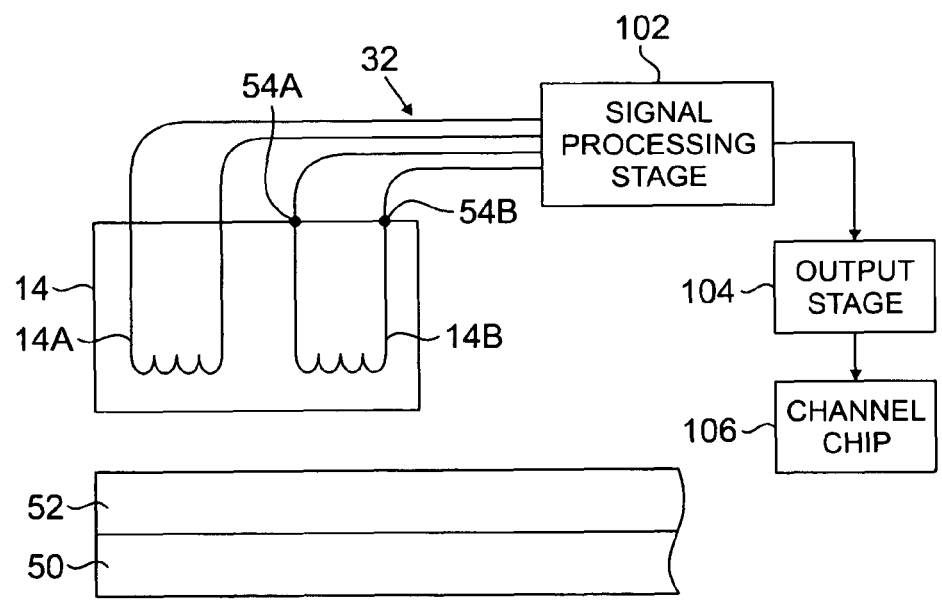
FIG. 2 is a schematic diagram of a prior art head and related components of the disk drive of FIG. 1.
Figure 3:
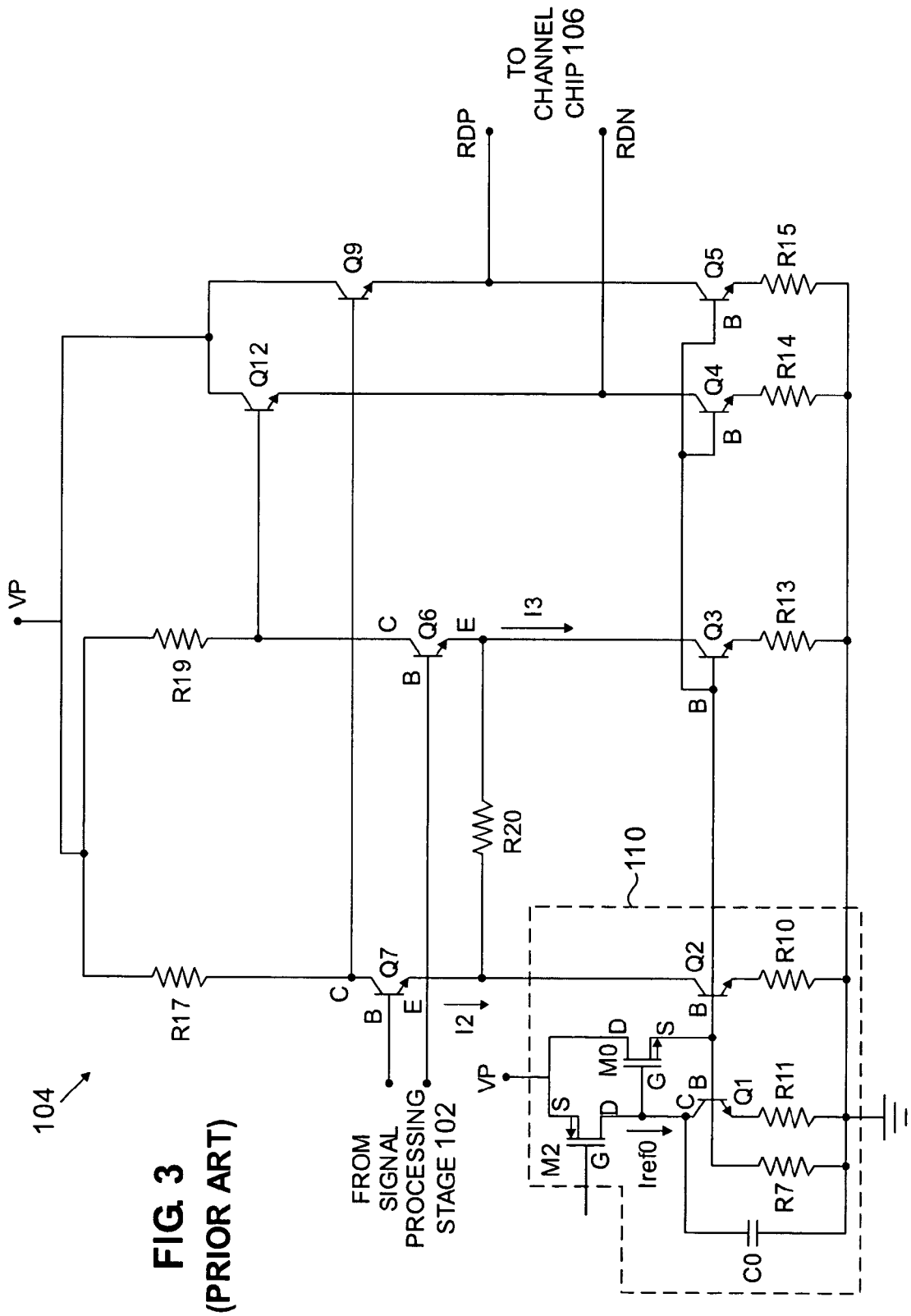
FIG. 3 is a schematic diagram of a prior art output stage of FIG. 2.
Figure 4:
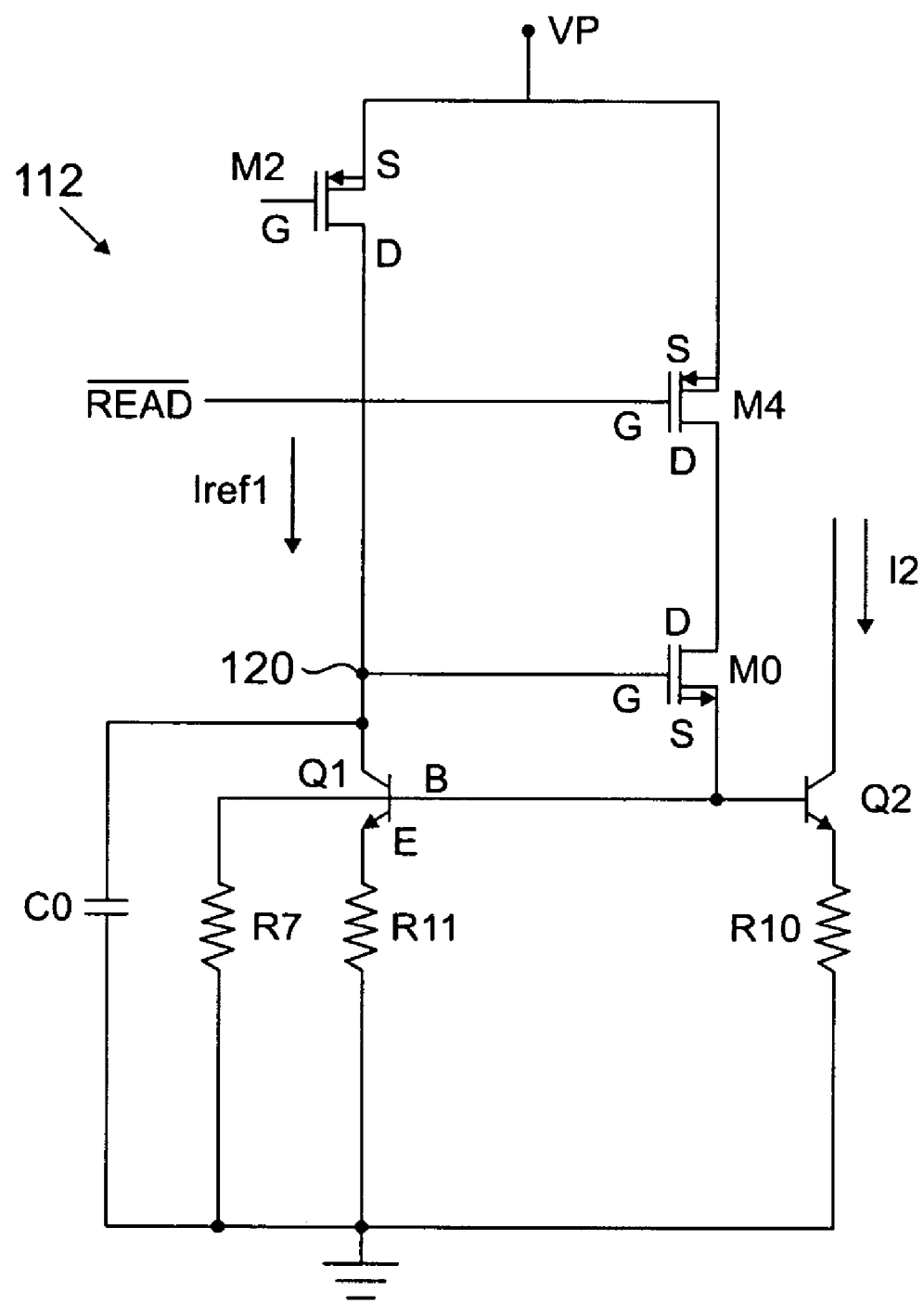
FIGS. 4 and 5 are schematic diagrams of certain elements for use in conjunction with the output stage of FIG. 3

FIG. 4 illustrates a current mirror controller 112 for use with the output stage 104 of FIG. 3 (replacing a current mirror controller 110 thereof) that limits the turn on time of the current mirror BJTS Q1, Q2, Q3, Q4 and Q5 by maintaining a charge on the capacitor C0 during non-read intervals such as during data writing and during an idle mode state. As described above, when data is read from the disk 12, the current mirrors are turned on to activate the amplifier comprising the BJTS Q6, Q7, Q9 and Q12. The amplifier scales up and buffers the voltage from the signal processing stage 102 for subsequent processing and data detection in the channel chip 106.

In the FIG. 4 circuit, a PMOSFET M2 is on during the non-read intervals (such as during data writing and during an idle mode) to supply a reference current Iref1 that maintains a charge on the capacitor C0. Since the current mirror BJTS Q1, Q2, Q3, Q4 and Q5 do not turn on until the capacitor C0 is charged, maintaining the capacitor C0 in a charged state avoids a time delay that would otherwise be required to charge the capacitor C0 before the current mirror BJTS Q1, Q2, Q3, Q4 and Q5 turn on at the beginning of a read operation. The PMOSFET M2 is on at all times except when the disk drive is operating in the sleep mode.

To conserve battery power, it is desired to turn off the current mirror BJTS Q1, Q2, Q3, Q4 and Q5 during data writing and idle periods. This is accomplished by turning off the PMOSFET M4 to open the current path through the NMOSFET M0 that supplies base current drive to the current mirror BJTS Q1, Q2, Q3, Q4 and Q5. The PMOSFET M4 is turned off by applying an inverse read signal, which is high during the write and idle modes, to a gate G.

With the BJT Q1 off, the PMOSFET M2 pulls a node 120 and the capacitor C0 to the power supply voltage VP as desired during non-read intervals. Note that when the current mirrors BJTS Q1, Q2, Q3, Q4 and Q5 are active, the NMOSFET M0, the BJT Q1, the resistor R11 and the current Iref determine the voltage at the node 120.

During a read operation, the inverse read signal goes low, gating the PMOSFET M4 on, permitting the NMOSFET M0 to supply base current to turn on the current mirror BJTS Q1, Q2, Q3, Q4 and Q5. Since the capacitor C0 had been charged to the power supply VP, at the beginning of read mode operation the capacitor C0 must discharge to an operating voltage of $Vgs_{M0}+Vbe_{Q1}+Iref1*R11$. During this discharging interval the current I2, the collector current of the BJT Q7 (see FIG. 3) overshoots its intended value for approximately 20 ns. The current overshoot causes the output common mode voltage at the output terminals RDP and RDN in FIG. 3 to fall then slowly recover as the capacitor C0 reaches its operating voltage. During the overshoot period a common mode transient is supplied to the channel chip 106 through Q12 and Q9 of FIG. 3. Obviously, this is not an acceptable condition as it may adversely impact reading of the first several data bits from the disk 12.

Figure 5:
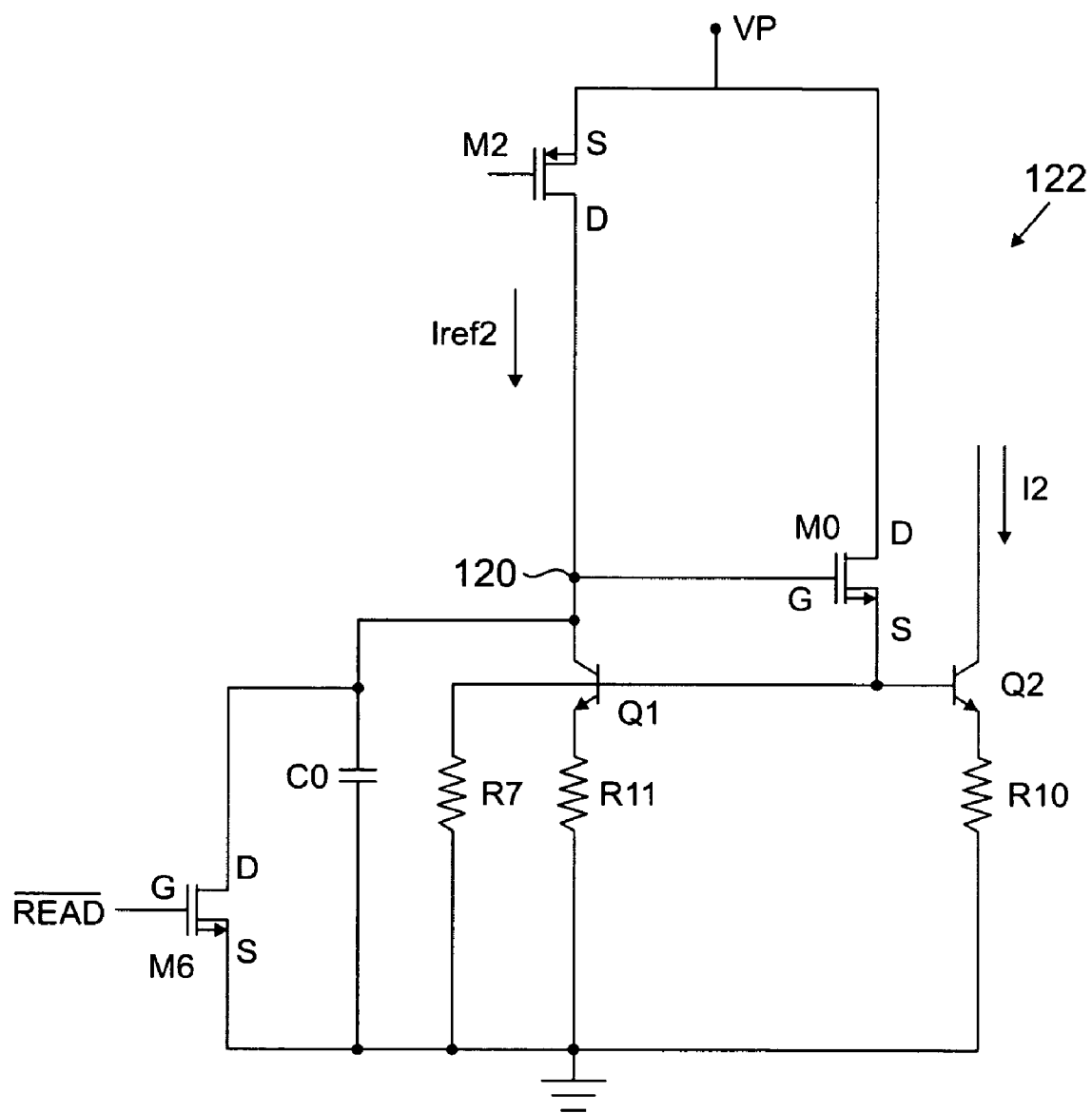

FIG. 5 illustrates a current mirror controller 122 for limiting the turn on time of the current mirrors. In the FIG. 5 embodiment, an NMOSFET M6 is turned on during data writing and idle operation (by a high logic state of the inverse read signal applied to a gate G of the NMOSFET M6), shunting the reference current Iref2 to ground and shorting the capacitor C0 and the node 120 to ground. As a result, the gate G of the NMOSFET M0 is at ground potential and the NMOSFET M0 is off. No current flows through the NMOSFET M0 to supply base current to drive the current mirrors so the current mirror BJTS Q1, Q2, Q3, Q4 and Q5 are off.

During data reading the NMOSFET M6 is turned off, permitting the capacitor C0 to charge to the power supply voltage and gating the NMOSFET M0 on to supply the base current for the current mirror BJTS Q1, Q2, Q3, Q4 and Q5. However, an extended mirror turn-on time (as long as 40 ns in one embodiment) is required to charge the capacitor C0 from ground to $Vgs_{M0}+Vbe_{Q3}+Iref2*R11$. Such a long turn on time may be unacceptable as the first several data bits read from the disk 12 may not be properly processed through the output stage 104.

Figure 6:
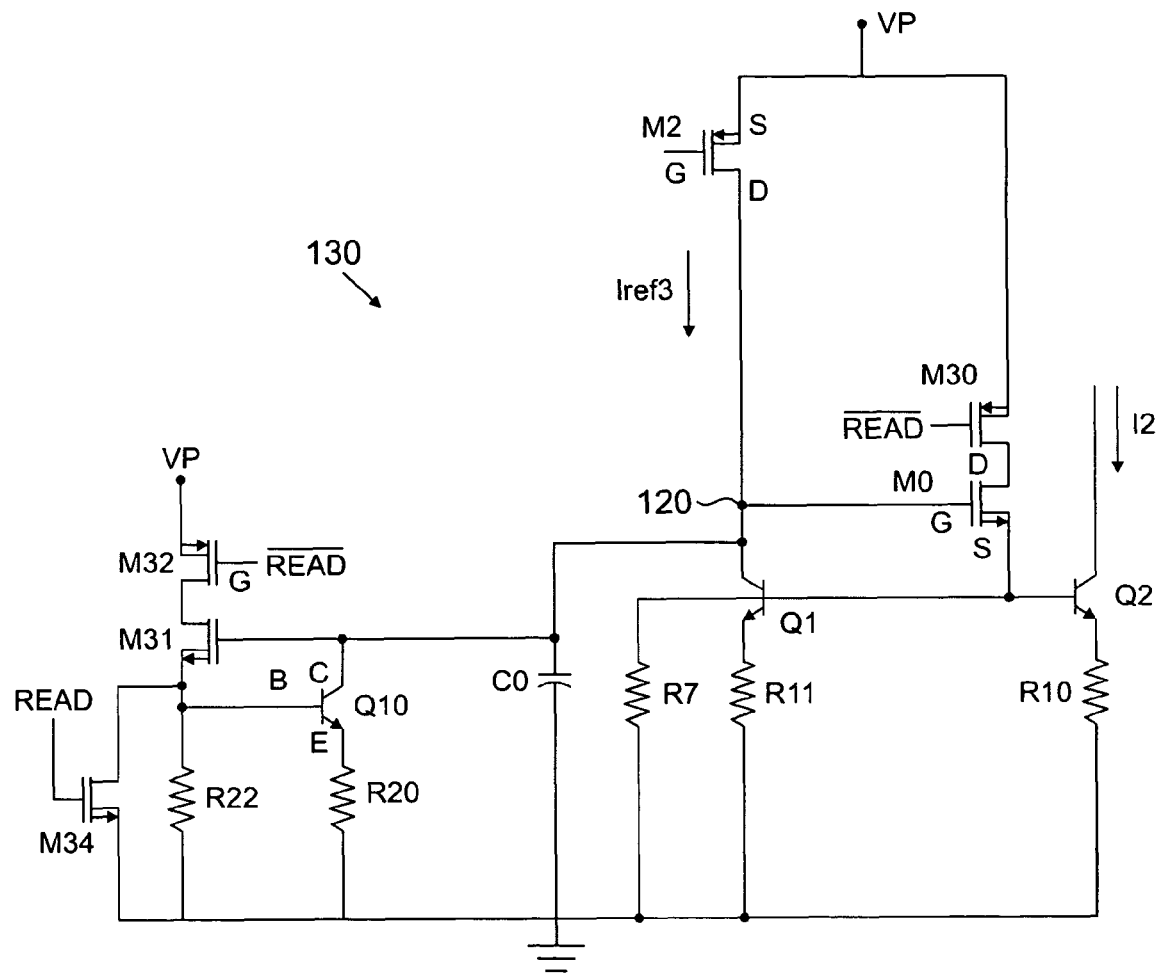
FIG. 6 is a schematic diagram of certain elements for use in conjunction with the output stage of FIG. 3 according to the present invention

FIG. 6 illustrates a schematic diagram of yet another current mirror controller 130 having a relatively fast settling time when compared with the current mirror controller 122 of FIG. 5 and avoiding the overshoot period associated with the current mirror controller 112 of FIG. 4. The current mirror controller 130 is can be used in place of the controller 110 of FIG. 3.

To minimize current mirror turn-on time at the start of each read cycle, during non-read intervals (e.g., during idle/write mode operation) the current mirror controller 130 clamps the voltage at the node 120 to a voltage that approximates the nodal voltage during the read mode. Preferably according to one embodiment, the idle/write mode bias voltage at the node 120 is set slightly below the nodal read mode voltage so that the current I2 does not overshoot the intended bias level at the start of a read operation.

The NMOSFET M0 provides the same functionality in the current mirror controller 130 as in the embodiments of FIGS. 3-5.

An inverse read signal having a high logic state during the idle and write modes gates a PMOSFET M30. During the idle and write modes, the inverse read signal controls the PMOSFET M30 to an open state, thereby shutting down the current mirrors by removing the current bias to the base of the mirror master BJT Q1 and each current mirror BJT Q2, Q3, Q4 and Q5. Turning off the current mirrors during idle and write modes conserves power, an especially important advantage for battery powered devices.

Current Iref3 supplied from the power supply VP under control of the PMOSFET M2 causes an NMOSFET M31 to turn on. The PMOSFET M2 is on during the idle, write and read modes. According to a preferred embodiment, Iref3 is turned off during a sleep mode of the disk drive 10 and anytime power is removed from the disk drive 10, by turning off M2. 25 μA is an exemplary value for Iref3, which is similar to Iref2 and Iref1 in the other embodiments. A resistor R22 operates as a pull down resistor for the NMOSFET M31.

A PMOSFET M32 is gated on by a low logic state of the read signal applied to a gate G. Thus when the read signal is low (during idle and write operations) the PMOSFET M32 is on and the transistor Q10 is on, permitting Iref3 current through the node 120, the collector-emitter path of the BJT Q10 and the resistor R20. The node voltage equals the collector-emitter voltage drop across the BJT Q10 plus a voltage drop across the resistor R20. The capacitor C0 is charged to the node voltage during the idle and write modes. Note the capacitance of the capacitor C0 can be the same in the embodiments of FIGS. 3-6.

To control the node voltage to approximately the same value in the read mode as in the write/idle modes, R20=R11 and Q10 has the same performance parameters as Q1. To ensure that the voltage at the node 120 is slightly lower during write/idle operation than the voltage during read operation, R22=40 kΩ while R7=10 kΩ, and M31 is 5 um wide while M0 is 10 um wide, permitting $Vgs_{M31}$ in the idle/write modes to be slightly lower than $Vgs_{M0}$ in the read mode.

Those skilled in the art recognize that these values are merely exemplary and other values can be used to achieve a $Vgs_{M31}$ voltage in the idle and write modes lower than $Vgs_{M0}$ in the read mode. For example, the devices sizes specified above control the voltage at the node 120 to approximately 1.9 V in the read mode and 1.8 V in the write/idle modes. The voltage difference of about 0.1 V was selected according to one embodiment based on expected performance variations (e.g., due to variations in component values) and the desired amount of undershoot and overshoot.

During the read mode the PMOSFET M30 is on and current is supplied from the power supply VP to the feedback loop comprising the MOSFET M0 and the BJT Q1, which supplies the base current to the BJT current mirrors Q2, Q3, Q4 and Q5.

Further during the read mode, the read signal supplied to the gate of the PMOSFET M32 and to a gate of an NMOSFET M34 turns the PMOSFET M32 off and the NMOSFET M34 on. When the PMOSFET M32 is off, the base drive for the BJT Q10 is removed. Further, when the NMOSFET M34 is on the base of the BJT Q10 is shorted to ground, turning Q10 off Thus the Iref3 current charges the capacitor C0 to its normal operating voltage, but because it had been charged to the voltage at the node 120 during write/idle operation, the charging time is significantly reduced from that of the FIG. 5 embodiment.

By maintaining the node 120 at about the same voltage during both read and idle/write operations, the charge time of the capacitor C0 is reduced and the turn-on time of the current mirrors is also reduced.

In another embodiment, one or more of the MOSFETS and BJTS as described herein is replaced by an opposite polarity MOSFET or BJT. The associated gate drive signals and power supply voltages are modified to accommodate the doping characteristics of the opposite polarity MOSFET or BJT, while providing the functionality of the present invention. Further, throughout the description of the present invention, the phrase, 'high' signal value is used interchangeably with a 'true' or an 'asserted' state. Those skilled in the art recognize that other signal values can also be associated with a 'true' or an 'asserted' logic state with a corresponding change in the device responsive to the logic state.

Figure 7:
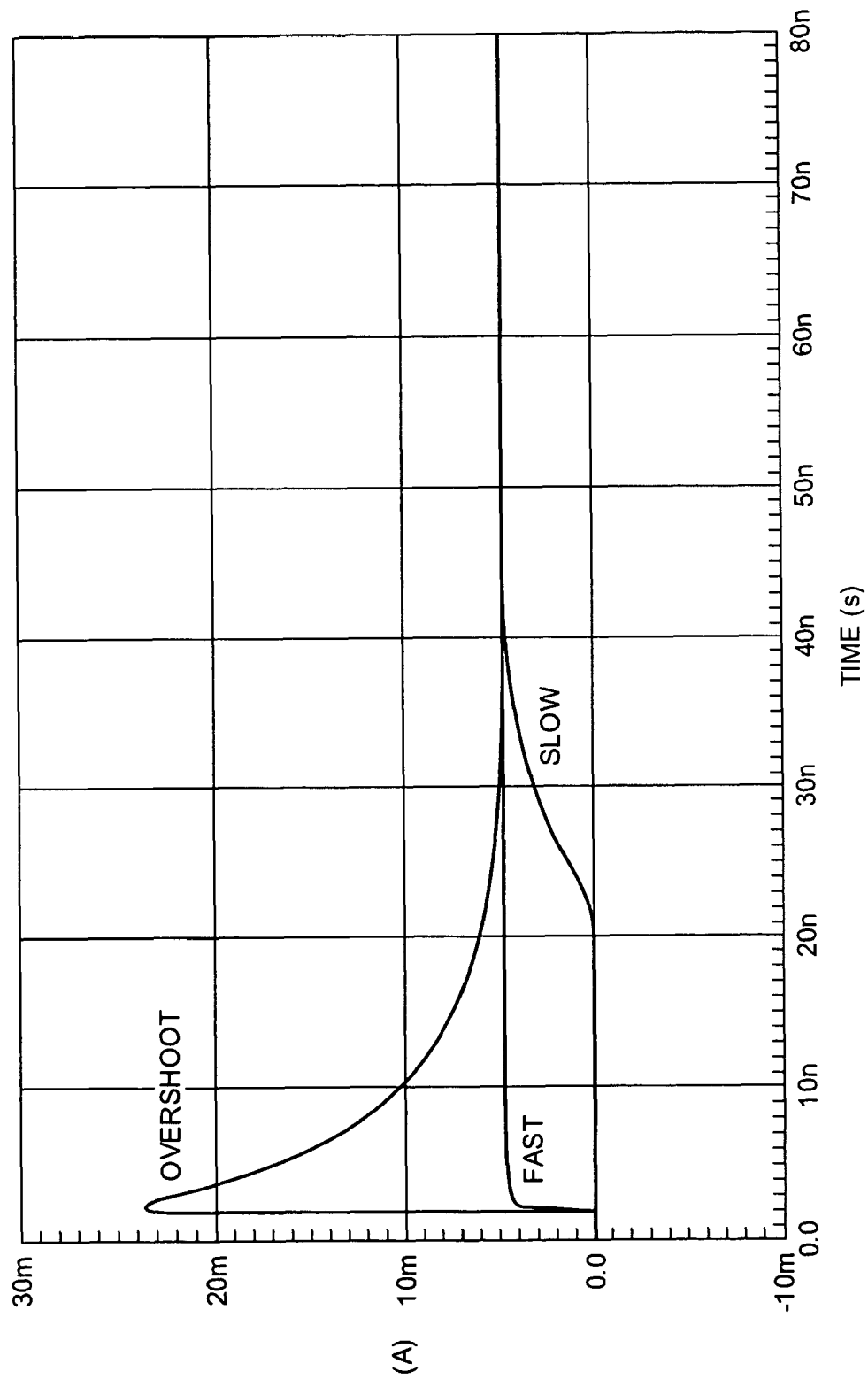
FIG. 7 illustrates timing diagrams of current magnitudes as a function of time for the three embodiments of FIGS. 4-6.

FIG. 7 shows three timing diagrams illustrating the current I2 (one of the mirrored currents) as a function of time for the three embodiments of the present invention. The "overshoo" curve is associated with the embodiment of FIG. 4, the "slow" curve is associated with the embodiment of FIG. 5 and the "fast" curve is associated with the embodiment of FIG. 6. The substantial improvement provided by the FIG. 6 embodiment is evident.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. Circuitry comprising a current mirror controller for controlling current mirrors, the current mirror controller comprising:
   a control node having a reference current therethrough;
   a current mirror master connected to the control node and receiving the reference current, the current mirror master connected to the current mirrors;
   a first switching device connected to a power supply controlling a state of the current mirror master;
   a circuit module configured to control a voltage at the control node to a first voltage during a first operational mode; and
   the circuit module configured to control the voltage at the control node to a second voltage during a second operational mode, wherein:
   the first switching device controls the current mirror master to an on state during the second operational mode during which the current mirrors mirror the reference current;
   a current produced by a one of the current mirrors is responsive to an area feature of the one of the current mirrors relative to the area feature of the current mirror master; and
   the first operational mode comprises an off state for the current mirrors and the second operational mode comprises a current-supplying state for the current mirrors.

2. The circuitry of claim 1, the current mirror controller further comprising a capacitor connected to the control node, wherein the circuit module controls a capacitor charge to the first voltage during the first operational mode and controls the capacitor charge to the second voltage during the second operational mode.

3. The circuitry of claim 1 wherein the current mirror master comprises a BJT having an emitter terminal connected to ground via a resistor, a collector terminal connected to the control node and a base terminal receiving drive current from the first switching device.

4. The circuitry of claim 1 wherein the first voltage is less than the second voltage.

5. The circuitry of claim 1 wherein the first switching device comprises a MOSFET supplying a drive current to the current minor master and to the current minors in the second operational mode, wherein in response to the drive current the current mirrors mirror the reference current.

6. The circuitry of claim 5 wherein the circuit module comprises a second switching device in series relationship with the first switching device controlling the first switching device in response to a control signal supplied to a control terminal of the second switching device, wherein in the first operational mode the control signal controls the second switching device to interrupt the drive current provided by the first switching device and in the second operational mode the control signal controls the second switching device to permit the first switching device to supply the drive current to the current mirror master, in response to which the current mirrors mirror the reference current.

7. The circuitry of claim 1 wherein the circuit module comprises:
a controllable current path from the control node to ground, wherein during the first operational mode the first current path comprises a first resistance, and wherein the first voltage is responsive to the first resistance; and
wherein during the second operational mode the controllable current path comprises a second resistance, and wherein the second voltage is responsive to the second resistance.

8. The circuitry of claim 1, the current minor controller further comprising a switching device connected to the control node providing the reference current to the control node, wherein the switching device is responsive to a control signal controlling the reference current.

9. The circuitry of claim 1 wherein the current mirrors are operative to supply current to an amplifier during a data read mode of a disk drive data storage system.

10. The circuitry of claim 9 wherein the first operational mode comprises a non-read interval of the disk drive data storage system and the second operational mode comprises a data read interval of the disk drive data storage system.

11. The circuitry of claim 1 wherein the circuit module further comprises:
a second switching device in series relationship with the first switching device controlling the first switching device in response to a control signal supplied to a control terminal of the second switching device, wherein in the first operational mode the control signal controls the second switching device to interrupt drive current supplied by the first switching device to the current mirror master in response to which the current mirror master and the current mirrors are in an off condition;
wherein in the second operational mode the control signal controls the second switching device to permit the first switching device to supply drive current to the current mirror master in response to which the current mirror master and the current mirrors are in an on condition during which the current mirrors supply a current related to the reference current;
a control device having a control terminal connected to the control node and a current path therethrough, the control device operative in response to a signal supplied to the control terminal in response to which during the first operational mode the control device presents a closed current path;
a third switching device having a control terminal and a current path therethrough operative in response to a signal supplied to the control terminal, wherein in response to a control signal supplied to the control terminal thereof during the first operational mode the third switching device presents a dosed current path;
wherein the current path of the control device is in serial relationship with the current path of the third switching device;
a control transistor having a collector-emitter path from the control node to ground and having a base terminal, wherein during the first operational mode the third switching device and the control device cooperate to control the control transistor to an on condition to produce the first voltage at the control node; and
a fourth switching device having a control terminal and a current path therethrough operative in response to a signal supplied to the control terminal thereof, wherein during the second operational mode the fourth switching device presents a closed current path to short the base terminal of the control transistor to ground and turn off the control transistor causing the voltage at the control node to reach the second voltage.

12. The circuitry of claim 11, the current mirror controller further comprising a capacitor connected between the control node and ground, wherein the capacitor charges to the second voltage when the control transistor is in the off state.

13. The circuitry of claim 1 wherein the circuit module further comprises:
a second switching device in series relationship with the first switching device controlling the first switching device in response to a control signal supplied to a control terminal of the second switching device, wherein in the first operational mode the control signal controls the second switching device to interrupt drive current supplied by the first switching device to the current mirror master in response to which the current mirror master and the current mirrors are in an off condition;
wherein in the second operational mode the control signal controls the second switching device to permit the first switching device to supply drive current to the current mirror master in response to which the current mirror master and the current mirrors are in an on condition during which the current mirrors supply a current related to the reference current;
a control device having a controllable current path therethrough and presenting a dosed current path during the first operational mode;
a third switching device having a controllable current path therethrough and, presenting a dosed current path during the first operational mode;
wherein the current path of the control device is in serial relationship with the current path of the third switching device;
a control transistor having a controllable current path therethrough between ground and the control node, wherein during the first operational mode the current paths of the third switching device and the control device are configured to control the control transistor to an on condition to produce the first voltage at the control node; and a fourth switching device having a controllable current path therethrough and presenting a dosed current path during the second operational mode to control the control transistor to an off condition in response to which the voltage at the control node comprises the second voltage.

14. The circuitry of claim 1, wherein the circuitry is a preamplifier for a disk drive data storage system, the circuitry further comprising:

an amplifier responsive to current produced by the current mirrors and further responsive to a voltage representing data bits read from the disk drive, wherein the amplifier amplifies the voltage representing the data bits.

15. The circuitry of claim 14 wherein the circuit module comprises:

a controllable current path from the control node to ground, wherein during the first operational mode the first current path comprises a first resistance, and wherein the first voltage is responsive to the first resistance; and wherein during the second operational mode the controllable current path comprises a second resistance, and wherein the second voltage is responsive to the second resistance.

16. The circuitry of claim 14 wherein the first voltage is less than the second voltage.

17. An amplifier/buffer, comprising:
a differential amplifier;
a buffer responsive to the differential amplifier;
a plurality of current sources supplying current to the differential amplifier and to the buffer;
a current source master;
a node, wherein a turn-on time of the plurality of current sources is responsive to a voltage at the node;
a reference current, wherein a current produced by each one of the plurality of current sources is responsive to the reference current;
a module controlling a voltage at the node to effect the turn on time of the plurality of current sources; and
a capacitor connected to the node, wherein the module controls the voltage at the node by charging the capacitor such that a capacitor voltage comprises a first voltage when the amplifier/buffer is in an idle state and controls the capacitor voltage to a second voltage when the amplifier/buffer is in an on state.

18. The amplifier/buffer of claim 17 operative to receive signals during a read interval, wherein the signals represent data bits stored in a magnetic material, and wherein the module controls the voltage to a first voltage during non-read intervals and controls the voltage to a second voltage during read intervals.

19. The amplifier/buffer of claim 18 wherein the first voltage is less than the second voltage.

20. An differential amplifier, comprising
a pair of differentially-connected transistors responsive each responsive to a differential input signal;
a first and a second current source each supplying current to one of the transistors;

a current source master,
a node, wherein a turn-on time of the first and the second current sources is responsive to a voltage at the node;
a reference current, wherein a current produced by the first and the second current sources is responsive to the reference current,
a module controlling a voltage at the node to effect the turn on time of the first and the second current sources; and
a capacitor connected to the node, wherein the module controls the voltage at the node by charging the capacitor such that a capacitor voltage comprises a first voltage when the differential amplifier is in an idle state and controls the capacitor voltage to a second voltage when the differential amplifier is in an on state.

21. The amplifier of claim 20 wherein the first voltage is less than the second voltage.

22. A current mirror, comprising
a current mirror master,
a plurality of current mirrors responsive to the current mirror master;
a node connected to the current mirror master, wherein a turn-on time of the plurality of current mirrors is responsive to a voltage at the node;
a reference current through the node and the current mirror master, wherein a current produced by each one of the plurality of current mirrors is responsive to the reference current;
a module configured to control a voltage at the node to effect the turn on time of the plurality of current mirrors; and
a capacitor connected to the node, wherein the module controls the voltage at the node by charging the capacitor such that a capacitor voltage comprises a first voltage when the current mirror is in an idle state and controls the capacitor voltage to a second voltage when the current mirror is in an on state.

23. A method for controlling current minors, comprising
controlling a voltage at a control node to a first voltage during a first operational mode and to a second voltage during a second operational mode, wherein a capacitor is connected to the control node;
supplying a reference current through the control node to a current mirror master, wherein during the second operational mode the reference current is mirrored and scaled by the current mirrors;
charging the capacitor from the first voltage to the second voltage at an onset of the second operational mode such that after the capacitor is charged to the second voltage the current mirrors are turned on to mirror the reference current; and
using a capacitor connected to the control node, wherein the voltage at the node is controlled by charging the capacitor such that a capacitor voltage comprises a first voltage when the current minors are in an idle state and the capacitor voltage is controlled to a second voltage when the current minors are in an on state.

* * * * *